United States Patent
Park et al.

(10) Patent No.: US 9,547,789 B2
(45) Date of Patent: Jan. 17, 2017

(54) MOBILE TERMINAL AND METHOD FOR CONTROLLING THE SAME

(71) Applicant: LG ELECTRONICS INC., Seoul (KR)

(72) Inventors: Junbum Park, Seoul (KR); Younghwan Kim, Seoul (KR); Jungju Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/677,709

(22) Filed: Apr. 2, 2015

(65) Prior Publication Data

US 2016/0171281 A1 Jun. 16, 2016

(30) Foreign Application Priority Data

Dec. 12, 2014 (KR) .................. 10-2014-0179629

(51) Int. Cl.
| | |
|---|---|
| G06K 9/00 | (2006.01) |
| G06F 3/041 | (2006.01) |
| G06F 3/048 | (2013.01) |
| G06F 21/32 | (2013.01) |
| G06F 3/0354 | (2013.01) |
| G06F 1/16 | (2006.01) |
| G06F 3/044 | (2006.01) |
| H04M 1/725 | (2006.01) |

(52) U.S. Cl.
CPC ......... *G06K 9/00087* (2013.01); *G06F 1/1643* (2013.01); *G06F 3/03547* (2013.01); *G06F 3/041* (2013.01); *G06F 3/044* (2013.01); *G06F 3/048* (2013.01); *G06F 21/32* (2013.01); *G06K 9/0002* (2013.01); *G06F 2203/0338* (2013.01); *H04M 1/72522* (2013.01)

(58) Field of Classification Search
CPC ........ G06F 3/0488; G06F 21/31; G06F 21/32; G06F 3/044; G06F 1/1643; G06F 3/03547; G06F 3/041; G06F 3/048; G06F 9/0002; G06F 9/00087
USPC ........ 382/115, 124, 190, 218; 340/5.8, 5.82, 340/5.83; 713/186; 902/3, 5
See application file for complete search history.

(56) References Cited

U.S. PATENT DOCUMENTS

| | | | |
|---|---|---|---|
| 8,311,514 B2 * | 11/2012 | Bandyopadhyay ... | G06F 1/1643 455/410 |
| 2001/0036299 A1 | 11/2001 | Senior | |
| 2004/0239648 A1 | 12/2004 | Abdallah et al. | |
| 2012/0127179 A1 * | 5/2012 | Aspelin ................... | G06F 21/32 345/441 |
| 2013/0135247 A1 | 5/2013 | Na et al. | |

(Continued)

*Primary Examiner* — Daniel Mariam
(74) *Attorney, Agent, or Firm* — Birch, Stewart, Kolasch & Birch, LLP

(57) ABSTRACT

A mobile terminal including a wireless communication unit configured to provide wireless communication; a display unit including a touch sensor and a fingerprint recognition sensor overlapped with the touch sensor; and a controller configured to deactivate the fingerprint recognition sensor, receive a finger touch input on the display unit, extract, from the touch sensor, touch information related to a touch region where the finger touch input has been applied on the display unit, activate the fingerprint recognition sensor when the extracted touch information indicates a sufficient finger touch input has been received, sense fingerprint information of the finger using the activated fingerprint recognition sensor, and perform fingerprint authentication with respect to the sensed fingerprint information based on the extracted touch information.

16 Claims, 14 Drawing Sheets

(56) References Cited

U.S. PATENT DOCUMENTS

| | | | |
|---|---|---|---|
| 2013/0287272 A1 | 10/2013 | Lu et al. | |
| 2014/0341446 A1 | 11/2014 | Hare et al. | |
| 2015/0139511 A1* | 5/2015 | Yoon | G06K 9/00919 382/124 |
| 2015/0235098 A1* | 8/2015 | Lee | G06K 9/00912 715/709 |
| 2015/0371073 A1* | 12/2015 | Cho | G06K 9/00006 382/124 |
| 2015/0379209 A1* | 12/2015 | Kusuma | H04L 67/10 705/3 |

* cited by examiner

<PERFORM FINGERPRINT AUTHENTICATION>

FIG. 7A
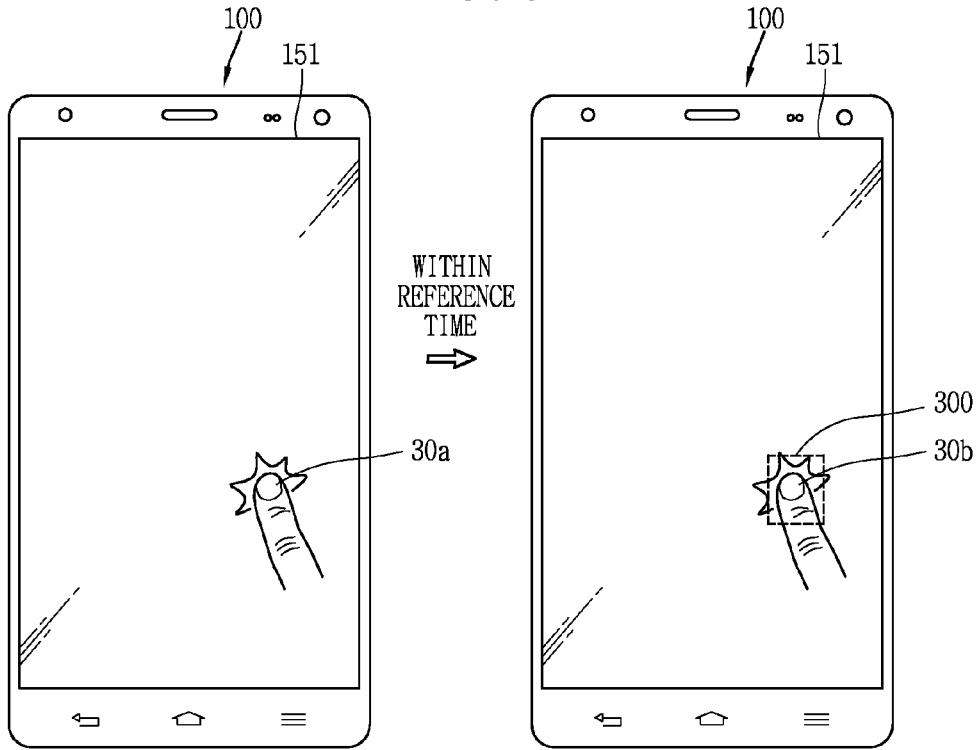
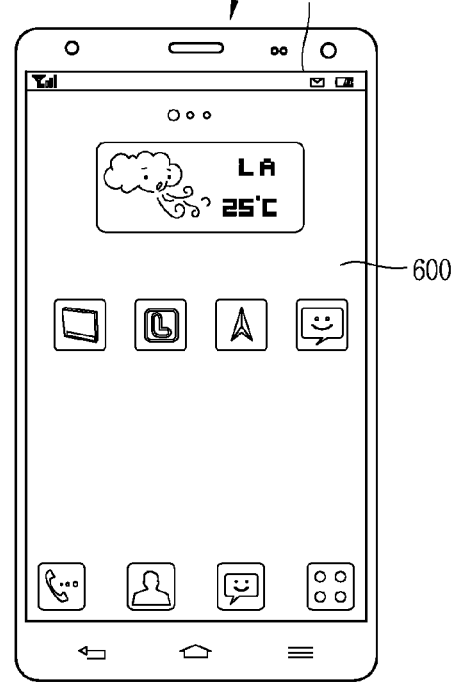

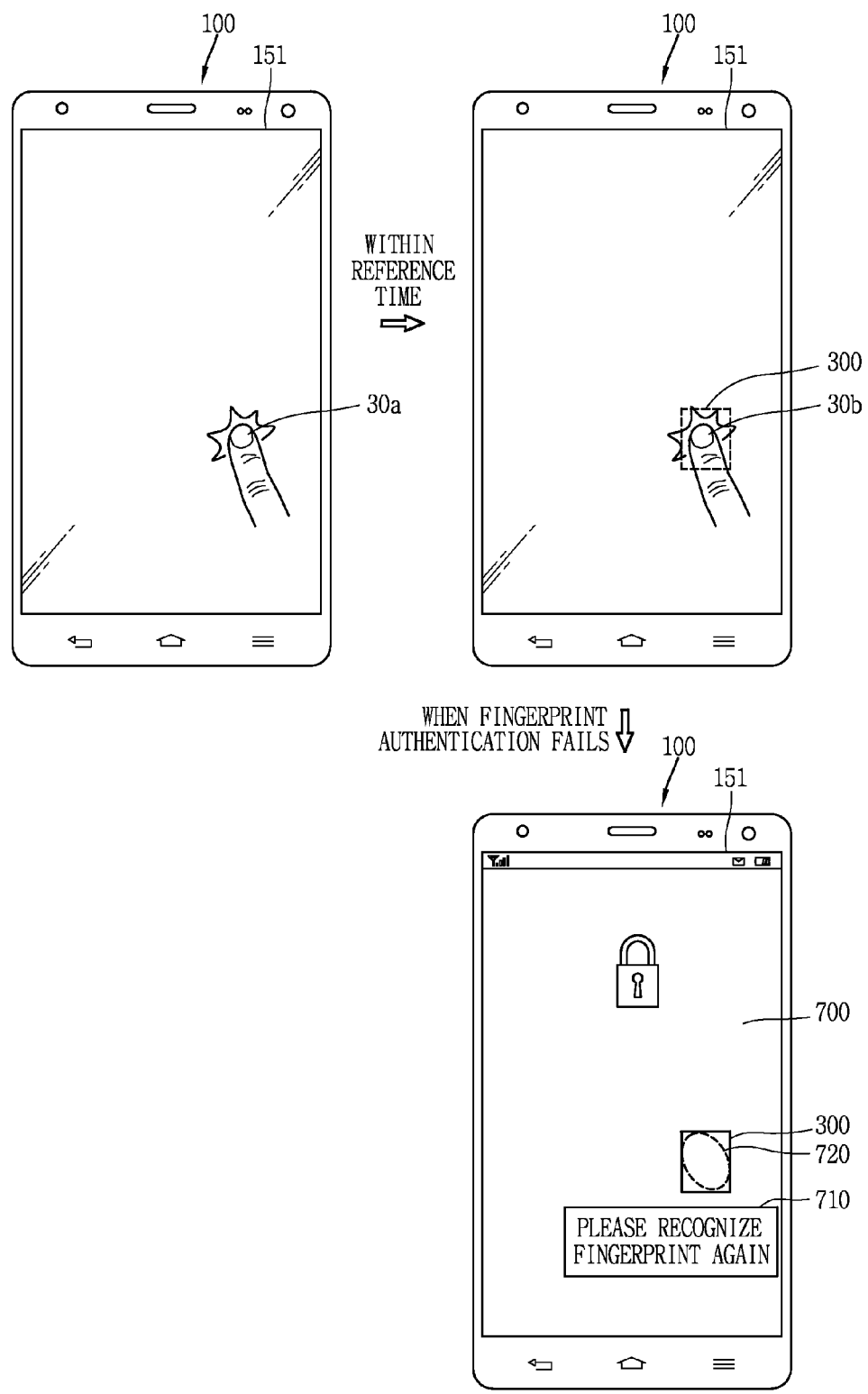

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0179629, filed on Dec. 12, 2014, the contents of which is incorporated by reference herein in its entirety.

BACKGROUND OF THE INVENTION

1. Field of the Invention

This specification relates to a mobile terminal, and more particularly, a mobile terminal capable of recognizing a user's fingerprint and a method for controlling the same.

2. Background of the Invention

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Recently, various user interfaces (UIs) and user experiences (UXs) using a fingerprint are being developed. For instance, the related art mobile terminal includes a fingerprint recognition function, and security may be enhanced through a fingerprint recognized by the fingerprint recognition function.

SUMMARY OF THE INVENTION

Therefore, an aspect of the detailed description is to provide a mobile terminal capable of authenticating a user's fingerprint information using a touch sensor and a fingerprint recognition sensor overlapped with each other, and a method for controlling the same.

Another object of the detailed description is to provide a mobile terminal capable of performing fingerprint authentication with respect to fingerprint information sensed by a fingerprint recognition sensor, in an optimum manner, using touch information extracted from a touch sensor, and a method for controlling the same.

Another object of the detailed description is to provide a mobile terminal capable of performing a specific function, using fingerprint information of a finger which has applied a touch input to a touch sensor and a fingerprint recognition sensor, and a method for controlling the same.

To achieve these and other advantages and in accordance with the purpose of this specification, as embodied and broadly described herein, there is provided a mobile terminal, including: a terminal body; a display unit provided on a front surface of the terminal body, and including a touch sensor and a fingerprint recognition sensor overlapped with the touch sensor; and a controller configured to extract, from the touch sensor, touch information related to a touch region where a touch input has been applied to the display unit, configured to sense fingerprint information of a finger which has applied the touch input to the touch region, using the fingerprint recognition sensor, and configured to use the touch information related to the touch region when performing fingerprint authentication with respect to the sensed fingerprint information.

In an embodiment, the touch information related to the touch region may include at least one of coordinate information of the touch region on the display unit where the touch input has been applied, and angle information indicating a tilted degree of a longest axis of the touch region based on a preset axis.

In an embodiment, the controller may determine a position where the fingerprint information has been sensed, using the coordinates information of the touch region, when performing the fingerprint authentication.

In an embodiment, the controller may be configured to perform the fingerprint authentication based on whether the sensed fingerprint information is consistent with pre-stored fingerprint information or not, and the controller may be configured to determine a tilted degree of the sensed fingerprint information based on the pre-stored fingerprint information, based on the angle information extracted from the touch sensor.

In an embodiment, when the angle information has a specific size in one direction, the controller may rotate the sensed fingerprint information in another direction opposite to the one direction, by the specific size, and determine whether the rotated fingerprint information is consistent with the pre-stored fingerprint information.

In an embodiment, the controller may extract pressure information of the touch input, using the touch information related to the touch region where the touch input has been applied. When the pressure information of the touch input is out of a reference range, the controller may output notification information requesting for a new touch input to the touch region, before sensing the fingerprint information.

In an embodiment, the fingerprint recognition sensor may be converted into an activated state from a deactivated state when the touch input is applied to the display unit.

In an embodiment, when a preset type of touch input is applied to the display unit which is in a deactivated state, and when fingerprint information of a finger which has applied the preset type of touch input corresponds to pre-stored fingerprint information, the controller may convert the deactivated state of the display unit into an activated state.

In an embodiment, the preset type of touch input may be touch inputs applied at least twice within a reference time.

In an embodiment, the controller may perform fingerprint authentication using fingerprint information of a finger which has applied a last touch input among the at least two touch inputs.

In an embodiment, when a first touch input is applied to the display unit, the controller may extract, from the touch sensor, touch information related to a touch region to which the first touch input has been applied. When a second touch input different from the first touch input is applied to the touch region to which the first touch input has been applied, the controller may sense fingerprint information of a finger which has applied the second touch input, using the fingerprint recognition sensor. When performing fingerprint authentication with respect to fingerprint information of the finger which has applied the second touch input, the controller may use touch information related to the touch region to which the first touch input has been applied.

In an embodiment, when the second touch input is applied to a touch region different from the touch region where the first touch input has been applied, the controller may extract touch information related to the touch region where the second touch input has been applied. For fingerprint authentication, the controller may use the touch information related to the touch region where the second touch input has been applied, rather than the touch information related to the touch region where the first touch input has been applied.

In an embodiment, the fingerprint recognition sensor may be converted into an activated state from a deactivated state when the first touch input is applied.

In an embodiment, when a preset type of touch input is applied to the display unit which is in a deactivated state, the controller may convert the display unit into an activated state, and may output different screen information based on whether fingerprint authentication with respect to fingerprint information of a finger which has applied the preset type of touch input has been successful or not.

In an embodiment, when the mobile terminal is in a locked state, the controller may release the locked state based on success of the fingerprint authentication, and may output a home screen page to the activated display unit. When the fingerprint authentication fails when the mobile terminal is in a locked state, the controller may output a screen corresponding to the locked state, to the activated display unit.

In an embodiment, a graphic object for guiding a touch region where a preset type of touch input has been applied may be displayed on the screen corresponding to the locked state. If a new touch input is applied to the graphic object, the controller may sense fingerprint information of a finger which has applied the new touch input, and may use touch information related to the touch region where the preset type of touch input has been applied, at the time of performing fingerprint authentication with respect to the sensed fingerprint information.

To achieve these and other advantages and in accordance with the purpose of this specification, as embodied and broadly described herein, there is also provided a method of controlling a mobile terminal, the method including: when a touch input is applied to a display unit, extracting touch information related to a touch region where the touch input has been applied, from a touch sensor included in the display unit; sensing fingerprint information of a finger which has applied the touch input to the touch region, using a fingerprint recognition sensor disposed to overlap the touch sensor; and using the touch information related to the touch region, at the time of performing fingerprint authentication with respect to the sensed fingerprint information.

In an embodiment, the touch information related to the touch region may include at least one of coordinate information of the touch region on the display unit where the touch input has been applied, and angle information indicating a tilted degree of a longest axis of the touch region based on a preset axis.

In an embodiment, in the step of using the touch information, a tilted degree of the sensed fingerprint information based on the pre-stored fingerprint information may be determined based on the angle information extracted from the touch sensor.

In an embodiment, in the step of using the touch information, when the angle information has a specific size in one direction, the sensed fingerprint information may be rotated in another direction opposite to the one direction, by the specific size. Then, it may be determined whether the rotated fingerprint information is consistent with the pre-stored fingerprint information or not.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIGS. 6, 7A, 7B, 8, 9A and 9B are conceptual view illustrating functions executed based on a fingerprint authentication result with respect to a finger which has applied a preset type of touch input to a mobile terminal according to an embodiment of the present invention.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
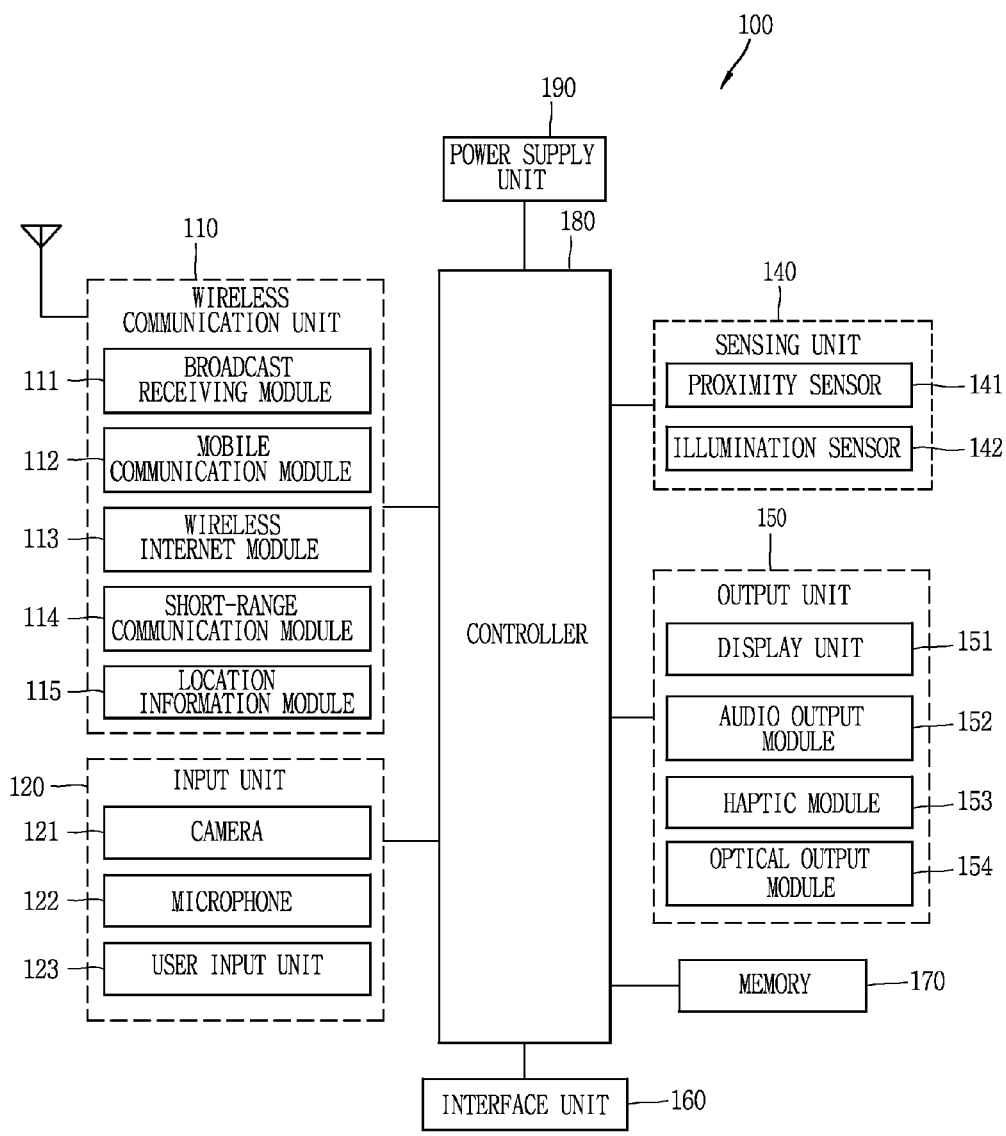
FIG. 1A is a block diagram illustrating a mobile terminal according to an embodiment of the present invention.
Figure 1B:
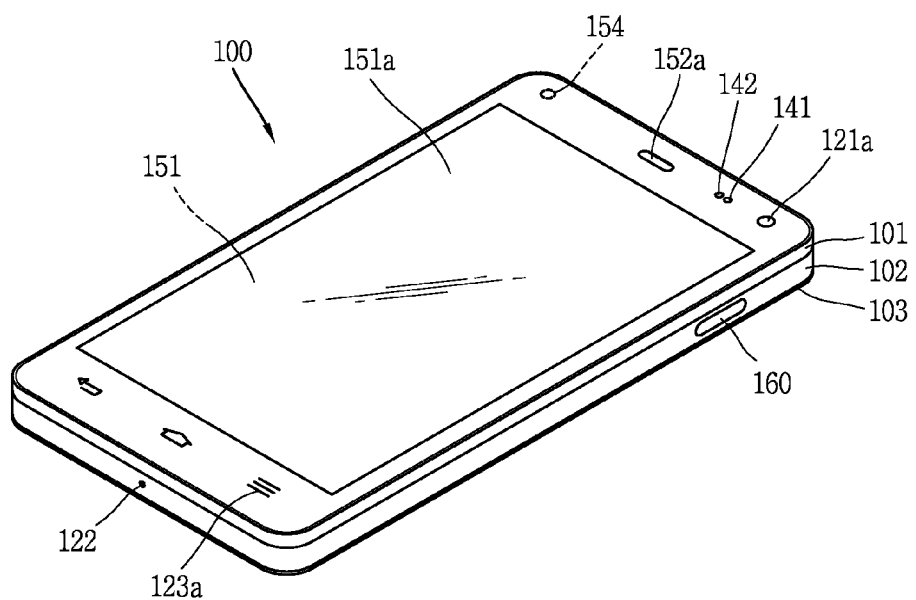
FIGS. 1B and 1C are conceptual views illustrating an example of a mobile terminal according to an embodiment of the present invention, which are viewed from different directions.
Figure 1C:
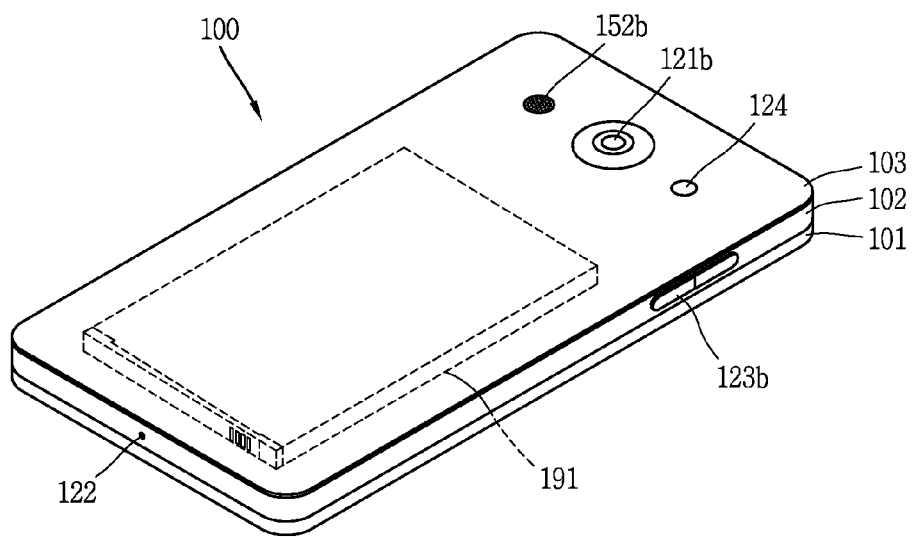

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source.

Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In explaining the following descriptions with respect to the attached drawings, when at least two images are illustrated in a single drawing in the form of 2 by 2, an image illustrated on a left upper side is called "first drawing", an image illustrated on a right upper side is called "second drawing", an image illustrated on a right lower side is called "third drawing", and an image illustrated on a left lower side is called "fourth drawing". When at least two images are illustrated in a line in a direction toward a lower end from an upper end, an image disposed on the uppermost end is called "first drawing", and the rest images are called "second drawing, third drawing, . . . " in order.

A mobile terminal according to an embodiment of the present invention, which can include at least one of the aforementioned components, may include a display unit 151 (or touch screen) provided with a touch sensor. Once a touch input is applied to the display unit 151, the mobile terminal 100 may sense the touch input using the touch sensor. For instance, the touch sensor may determine whether a touch input has been applied or not, based on change of capacitance of a capacitor provided at the touch sensor according to the touch input.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance of a touch object.

For instance, the controller 180 can determine a region where a touch input has been applied to the display unit 151, based on a point where capacitance of the touch sensor is changed. Further, the controller 180 can extract pressure of a touch input, based on at least one of a change degree of capacitance of the touch sensor, and a region where the touch input has been applied. The touch object is generally used to apply a touch input to the touch sensor. Examples of typical touch objects include a finger, a touch pen, a stylus pen, a pointer, or the like.

Hereinafter, it will be explained that the touch object is a finger. The touch sensor may sense a touch input applied from the touch object, even when the display unit 151 is in a deactivated state. For this, minimum power to sense a touch input even when the display unit 151 is in a deactivated state may be provided to the touch sensor. More specifically, if a touch input is applied in a deactivated state of the display unit 151, the controller 180 can sense the touch input, and may perform a specific function based on the sensed touch input. For instance, the specific function may be a function to convert a state of the display unit 151 to an activated state from a deactivated state.

When a touch input is sensed by the touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, within the controller 180, and combinations thereof. The mobile terminal 100 may be provided with a fingerprint recognition sensor for recognizing a user's fingerprint. The controller 180 can utilize fingerprint information sensed by the fingerprint recognition sensor, as an authentication means.

The fingerprint recognition sensor may be mounted to the display unit 151 or the user input unit 123. More specifically, the fingerprint recognition sensor may be formed to be overlapped with the touch sensor provided at the display unit 151. Once a touch input is applied to the display unit 151, the controller 180 can sense (recognize) fingerprint information of a finger which has applied the touch input, using a fingerprint recognition sensor. Further, once a touch input is applied to the display unit 151, the controller 180 can extract touch information related to the touch input using the touch sensor, and may sense fingerprint information of a finger which has applied the touch input using the fingerprint recognition sensor formed to be overlapped with the touch sensor. The touch information related to the touch input, and the fingerprint information may be generated based on at least one touch input applied to the display unit 151.

The fingerprint information may mean a fingerprint formed by an object which has applied a touch input, e.g., a user's finger. The fingerprint may be called fingerprint data, a fingerprint image, etc. The fingerprint information may mean information (data, image) obtained by sensing (recognizing, extracting) a fingerprint of a finger which has applied a touch input, using the fingerprint recognition sensor.

The controller 180 can perform fingerprint authentication using the sensed fingerprint information. More specifically, a fingerprint means a pattern formed by a curved line which is at an uppermost part of a finger. Such a fingerprint is not changed at all, and every user has his or her unique pattern. Further, the fingerprint is formed in a different shape according to each finger of the same person. More specifically, the fingerprint includes ridges and valleys, each valley formed between the two ridges. The fingerprint may include a pattern formed by the ridges and the valleys.

Fingerprint information may include a pattern formed at the fingerprint. Further, the fingerprint information may include a feature point (minutiae) such as a ridge end or a bifurcation. The controller 180 can perform fingerprint authentication based on the feature point. More specifically, the controller 180 can perform fingerprint authentication based on whether fingerprint information sensed by the fingerprint recognition sensor is pre-stored fingerprint information or not. In this instance, the controller 180 can perform fingerprint authentication, based on whether a feature point included in the sensed fingerprint information is consistent with a feature point included in pre-stored fingerprint information or not.

The pre-stored fingerprint information may be pre-stored in the memory 170 by a user's setting. More specifically, the controller 180 can receive fingerprint information (pre-stored fingerprint information) used for fingerprint authentication from a user, and then may store the received fingerprint information in the memory 170.

A plurality of fingerprint information may be pre-stored in the memory 170. The plurality of fingerprint information may be fingerprint information of each finger of a user. Alternatively, the plurality of fingerprint information may be fingerprint information of different parts included in a single finger. The fingerprint authentication may be performed by a fingerprint controller. More specifically, when a touch input is applied to the fingerprint recognition sensor (display unit 151), one or more signals corresponding to the touch input are transmitted to the fingerprint controller. The signal may be a signal generated by a touch input, or may be fingerprint information.

When the signal is generated by a touch input, the fingerprint controller may generate fingerprint information using the signal. Then, the fingerprint controller may perform fingerprint authentication by determining whether the generated fingerprint information corresponds to pre-stored fingerprint information. When the signal is fingerprint information, the fingerprint controller may perform fingerprint authentication using the fingerprint information. When the fingerprint controller performs fingerprint authentication, pre-stored fingerprint information may be stored in the fingerprint controller.

Then, the fingerprint controller transmits a fingerprint authentication result to the controller 180. Thus, the controller 180 can authenticate (recognize) a user who has applied a touch input, based on fingerprint information of a finger which has applied a touch input to the display unit 151. Further, the controller 180 can perform a different function according to the fingerprint authentication result. The fingerprint controller may be a separate component from the controller 180, or may be the controller 180 itself.

In the present invention, touch information extracted from the touch sensor may be used for fingerprint authentication. Hereinafter, a method of using touch information extracted from the touch sensor during fingerprint authentication will be explained in more detail with reference to the attached drawings. In particular, FIG. 2 is a flowchart illustrating a method of controlling a mobile terminal according to an embodiment of the present invention, and FIGS. 3A to 3C are conceptual illustrating the control method of FIG. 2.

Figure 2:
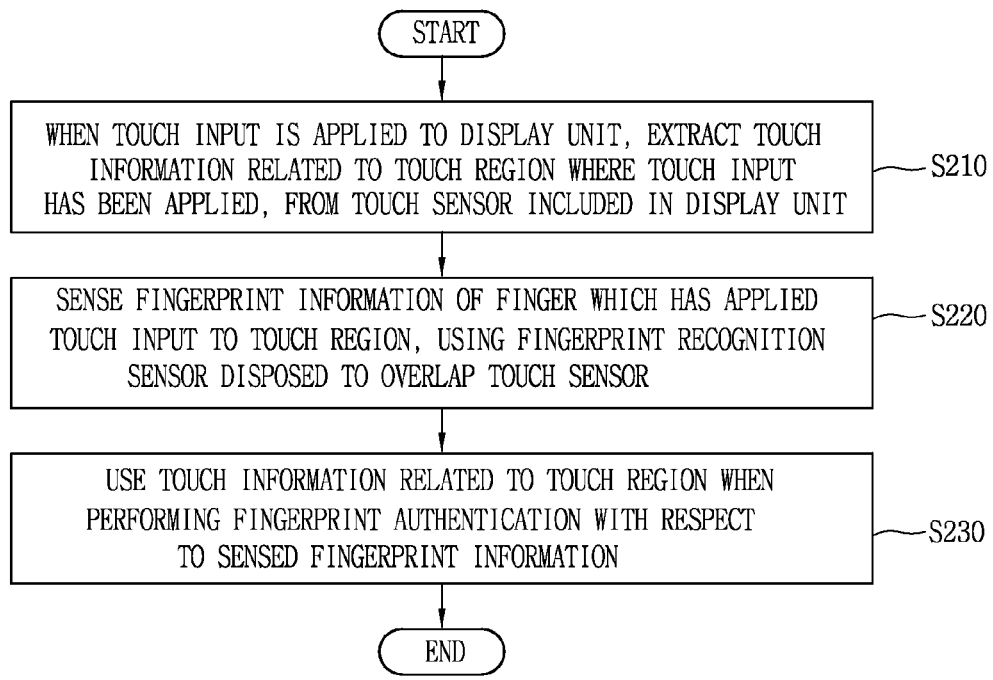
FIG. 2 is a flowchart illustrating a method of controlling a mobile terminal according to an embodiment of the present invention.
Figure 3A:
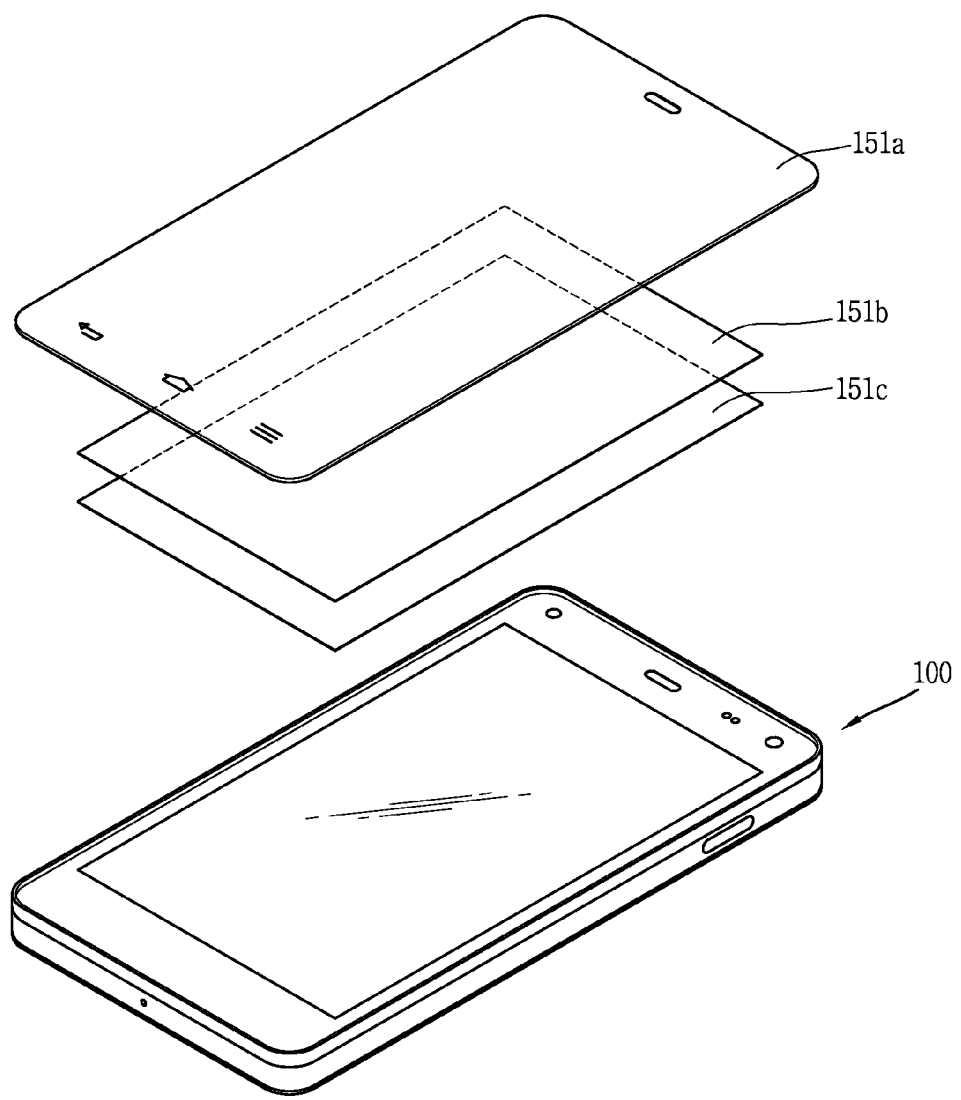
FIGS. 3A to 3C are conceptual illustrating the control method of FIG. 2.
Figure 3B:
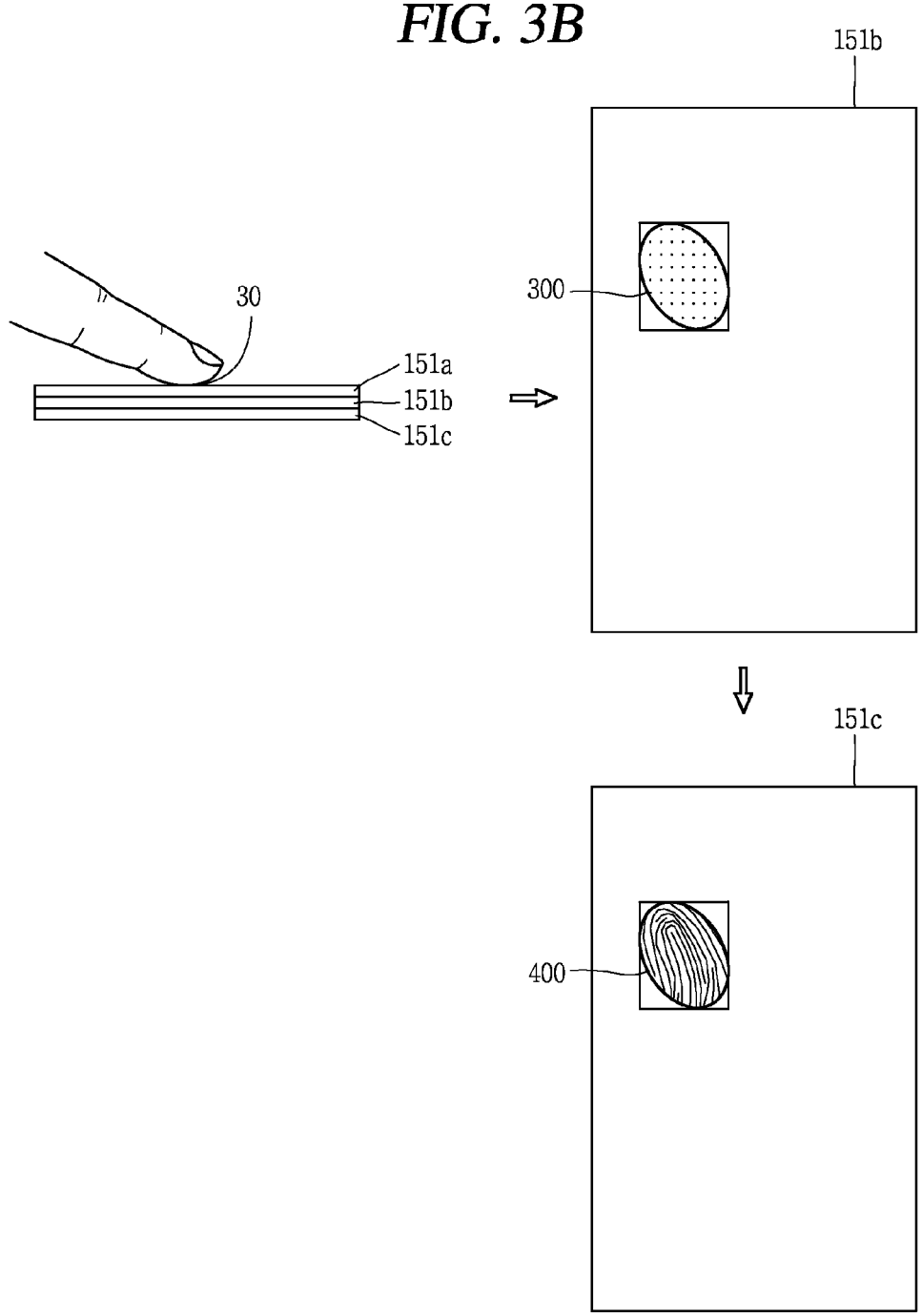
Figure 3C:
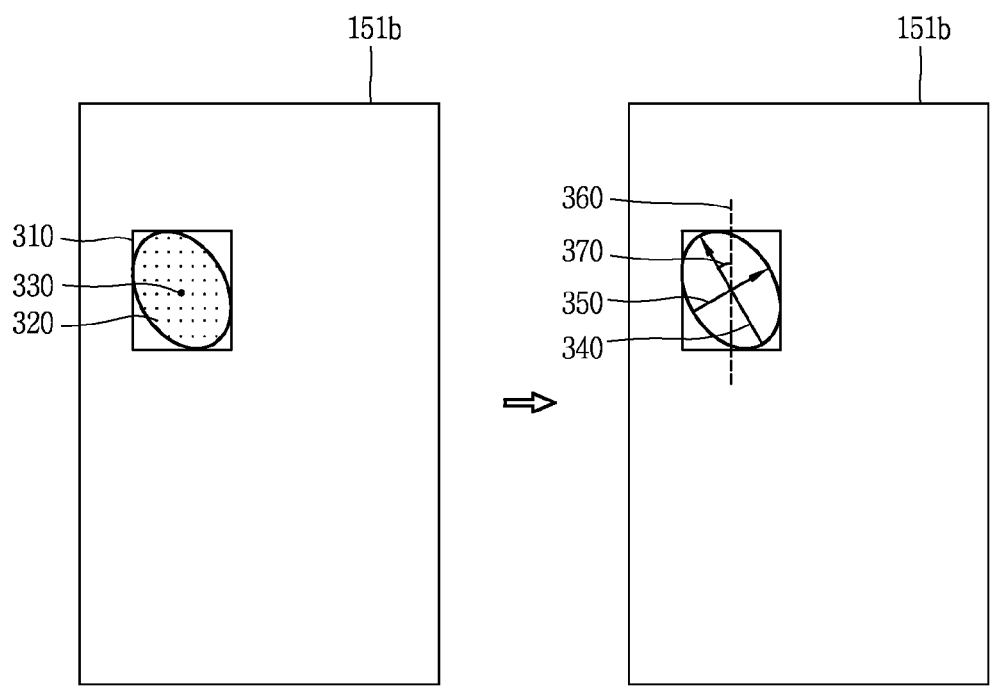

Referring to FIGS. 2 and 3, once a touch input 30 is applied to the display unit 151, touch information related to a region 300 to which the touch input 30 has been applied is extracted by a touch sensor 151b included the display unit 151 (S210).

More specifically, if the touch input 30 is applied to the display unit 151, the touch sensor 151b may transmit information on capacitance changed according to the touch input 30, to the controller 180. The controller 180 can extract touch information related to the touch region 300 to which the touch input 30 has been applied, based on the information on capacitance. The touch information related to the touch region 300 may be extracted by the touch sensor 151b. Detailed explanations about the touch information related to the touch region 300 will be explained later.

Next, fingerprint information of a finger which has applied a touch input to the touch region 300 is sensed by a fingerprint recognition sensor 151c disposed to be overlapped with the touch sensor 151b (S220). More specifically, the display unit 151 of the present invention may include the touch sensor 151b, and the fingerprint recognition sensor 151c disposed to be overlapped with the touch sensor 151b.

For instance, as shown in FIG. 3A, the display unit 151 may include the touch sensor 151b, and the fingerprint recognition sensor 151c disposed to be overlapped with the touch sensor 151b at least partially. The fingerprint recognition sensor 151c may have the same size as the touch sensor 151b, and may be overlapped with the touch sensor 151b. The fingerprint recognition sensor 151c may be formed to be overlapped with only at least part of the touch sensor 151b. The touch sensor 151b and the fingerprint recognition sensor 151c may be provided below a window 151a of the display unit 151, or may be included in the window 151a.

The fingerprint recognition sensor 151c may sense fingerprint information of a finger which has applied the touch input 30 to the display unit 151. Further, the controller 180 can sense fingerprint information 400 on a finger which has applied the touch input 30, using the fingerprint recognition sensor 151c. For instance, if the touch input 30 is applied to the display unit 151 including the touch sensor 151b and the fingerprint recognition sensor 151c disposed to be overlapped with the touch sensor 151b as shown in the first drawing of FIG. 3B, the touch sensor 151b can extract touch information related to a touch region 300 to which the touch input 30 has been applied, as shown in the second drawing of FIG. 3B. Further, as shown in the third drawing of FIG. 3B, the fingerprint recognition sensor 151c can sense fingerprint information 400 on a finger which has applied the touch input 30 to the touch region 300.

The step (S210) and the step (S220) may be performed simultaneously or sequentially when the touch input 30 is applied to the display unit 151. Then, when fingerprint authentication is performed with respect to the sensed fingerprint information 400, touch information related to the touch region 300 is used (S230).

More specifically, the controller 180 can use touch information related to the touch region 300, as at least part of information required to perform fingerprint authentication with respect to the fingerprint information 400. For instance, if it is assumed that first to fifth information is required to perform fingerprint authentication, touch information related to the touch region 300, rather than at least part of the first to fifth information (e.g., second and third information) may be used in an embodiment of the present invention.

Hereinafter, touch information related to the touch region 300 according to an embodiment of the present invention will be explained in more detail with reference to FIG. 3C. The touch information related to the touch region 300 may include coordinates information of the touch region 300 on the display unit 151 to which the touch input 30 has been applied. More specifically, the touch sensor 151b may include a node (or pixel) having a capacitance. Then, when the touch input 30 is applied to the touch sensor 151b, the touch sensor 151b may extract coordinates information 330 of at least one node of which capacitance is changed according to the touch input 30, as shown in the first drawing of FIG. 3C. The controller 180 can extract coordinates information of the touch region 300 to which the touch input 30 has been applied, based on the coordinates information 300 of nodes to which the touch input 30 has been applied.

When the touch input 30 is applied to the display unit 151, the controller 180 can extract a bounding box 310 including the touch region 300 to which the touch input 30 has been applied. As shown in the first drawing of FIG. 3C, the bounding box 310 may mean a smallest quadrangle among quadrangles which may include the touch region 300. That is, the controller 180 can extract coordinates of 4 vertexes of the bounding box 310. Further, the controller 180 can extract center coordinates 320 of the bounding box 310, based on the bounding box 310.

The controller 180 can determine a gradient of the touch region 300 to which the touch input 30 has been applied, based on the coordinates information 330 and the center coordinate 320 of the nodes. When it is determined that the touch region 300 has an oval shape (or a shape similar to an oval), the gradient of the touch region 300 may mean a tilted degree of a long axis of the oval. That is, the controller 180 can extract angle information indicating a tilted degree of a longest axis of the touch region 300 based on a preset axis, using the coordinates information 330 and the center coordinates 320 of the nodes. More specifically, the controller 180 can calculate a covariance, based on the coordinates information 330 and the center coordinates 320 of nodes to which a touch input has been applied.

Under an assumption that $i^{th}$ coordinates of the nodes is (x_i, y_i) and the center coordinates 320 is (x_c, y_c), a covariance matrix (C) may be calculated as the following formula 1.

$$C = \begin{bmatrix} C_{xx} & C_{xy} \\ C_{xy} & C_{yy} \end{bmatrix}$$ [Formula 1]

The C_xx, C_xy and C_yy may be defined as the following formulas 2 to 4.

$$C_{xx} = \Sigma(x_c - x_i)^2$$ [Formula 2]

$$C_{xy} = \Sigma(x_c - x_i)(y_c - y_i)$$ [Formula 3]

$$C_{yy} = \Sigma(y_c - y_i)^2$$ [Formula 4]

Then, the controller 180 can calculate an Eigen Value using the covariance matrix (C). The calculation equation may be defined as the following formula 5.

$$\lambda^2 - (C_{xx} + C_{yy})\lambda + (C_{xx}C_{yy} - C_{xy}^2) = 0$$

$$\lambda = \lambda_0, \lambda_1 (\lambda_0 > \lambda_1)$$ [Formula 5]

The controller 180 can extract a longest axis 340 and a shortest axis 350 included in the touch region 300, using a unique value (lambda_0, lambda_1) obtained from the formula 5. The longest axis 340 and the shortest axis 350 may be axes including (which pass through) the center coordinates of the bounding box 310.

Further, the controller 180 can extract angle information 370 using the unique value, the angle information indicating a tilted degree of the longest axis 340 of the touch region 300 based on a preset axis 360. The preset axis 360 may be an axis parallel to a longer side of the display unit 151.

That is, as shown in the second drawing of FIG. 3C, the controller 180 can extract the angle information 370 indicating a tilted degree of the longest axis 340 of the touch region 300 based on the preset axis 360. The angle information 370 indicating a tilted degree of the longest axis 340 of the touch region 300 may mean a tilted degree and a tilted direction of a finger which has applied the touch input 30, in a lengthwise direction of the display unit 151.

A length of the longest axis 340 of the touch region 300 is defined as a major value, and a length of the shortest axis 350 of the touch region 300 is defined as a minor value. The controller 180 can extract the major value, the minor value, and the angle information 370 indicating a tilted degree of the longest axis 340 of the touch region 300 based on the preset axis 360, using the unique value. Each value may be defined as the following formula 6.

$$\text{Angle} = \tan^{-1}\left(\frac{\lambda_1 - C_{xx}}{C_{xy}}\right)$$ [Formula 6]

$$\text{Major} = \alpha\sqrt{\lambda_0}$$

$$\text{Minor} = \alpha\sqrt{\lambda_1}$$

The controller 180 can reduce a calculation amount used to perform fingerprint authentication, using touch information related to the touch region and extracted through the aforementioned method. More specifically, the controller 180 can use touch information related to the touch region when performing fingerprint authentication. For instance, the controller 180 can determine a position where fingerprint information 400 has been sensed when performing fingerprint authentication, using coordinates information of the touch region.

As another example, the controller 180 can determine a tilted degree (rotated degree) of the fingerprint information 400 based on preset fingerprint information, using the angle information, and then may perform fingerprint authentication by rotating the sensed fingerprint information. In this configuration, in an embodiment of the present invention, a tilted degree of sensed fingerprint information based on preset fingerprint information is extracted not based on the fingerprint information itself, but based on angle information included in touch information. Thus, a calculation amount used for fingerprint authentication may be significantly reduced.

The controller 180 can extract pressure information of the touch input 30, using touch information related to the touch region 300 to which the touch input 30 has been applied. More specifically, the controller 180 can extract pressure information of the touch input 30, based on capacitance values of nodes to which the touch input 30 has been applied. For instance, the controller 180 can extract pressure information of the touch input 30, based on an average value of capacitance values of nodes to which the touch input 30 has been applied.

As another example, the controller 180 can extract a largest value among capacitance values of nodes to which the touch input 30 has been applied. Then, the controller 180 can extract pressure information of the touch input 30, based on an average value of difference values between the largest value and the capacitance values of the nodes. As the average value becomes larger, a larger pressure value may be included in the pressure information of the touch input 30.

Alternatively, the controller 180 can extract pressure information of the touch input 30, based on a size of the touch region 300 to which the touch input 30 has been applied. That is, the controller 180 can determine that pressure of the touch input is higher when a size of the touch region 300 is larger.

The controller 180 can output notification information based on the pressure information of the touch input 30. More specifically, when the pressure information of the touch input 30 is out of a reference range, e.g., when the touch input is applied with very high or very low strength, the controller 180 can output notification information requesting for a new touch input. The reason is because a state (quality) of sensed fingerprint information is different according to the pressure of a touch input, and because when the pressure of the touch input is out of a reference range, fingerprint authentication using fingerprint information sensed based on the touch input may fail with a high probability.

That is, the controller 180 can output notification information requesting for a new touch input, based on pressure information extracted based on touch information related to the touch region. If the pressure information is out of a reference range, the controller 180 can reduce a calculation amount by omitting a process of sensing fingerprint information using the fingerprint recognition sensor 151*c*.

The touch information related to the touch region (e.g., coordinates information and angle information of the touch region), and the pressure information of the touch input may be extracted by the controller 180 or the touch sensor 151*b*. Alternatively, the pressure information of the touch input may be understood to be included in the touch information related to the touch region.

Figure 4:
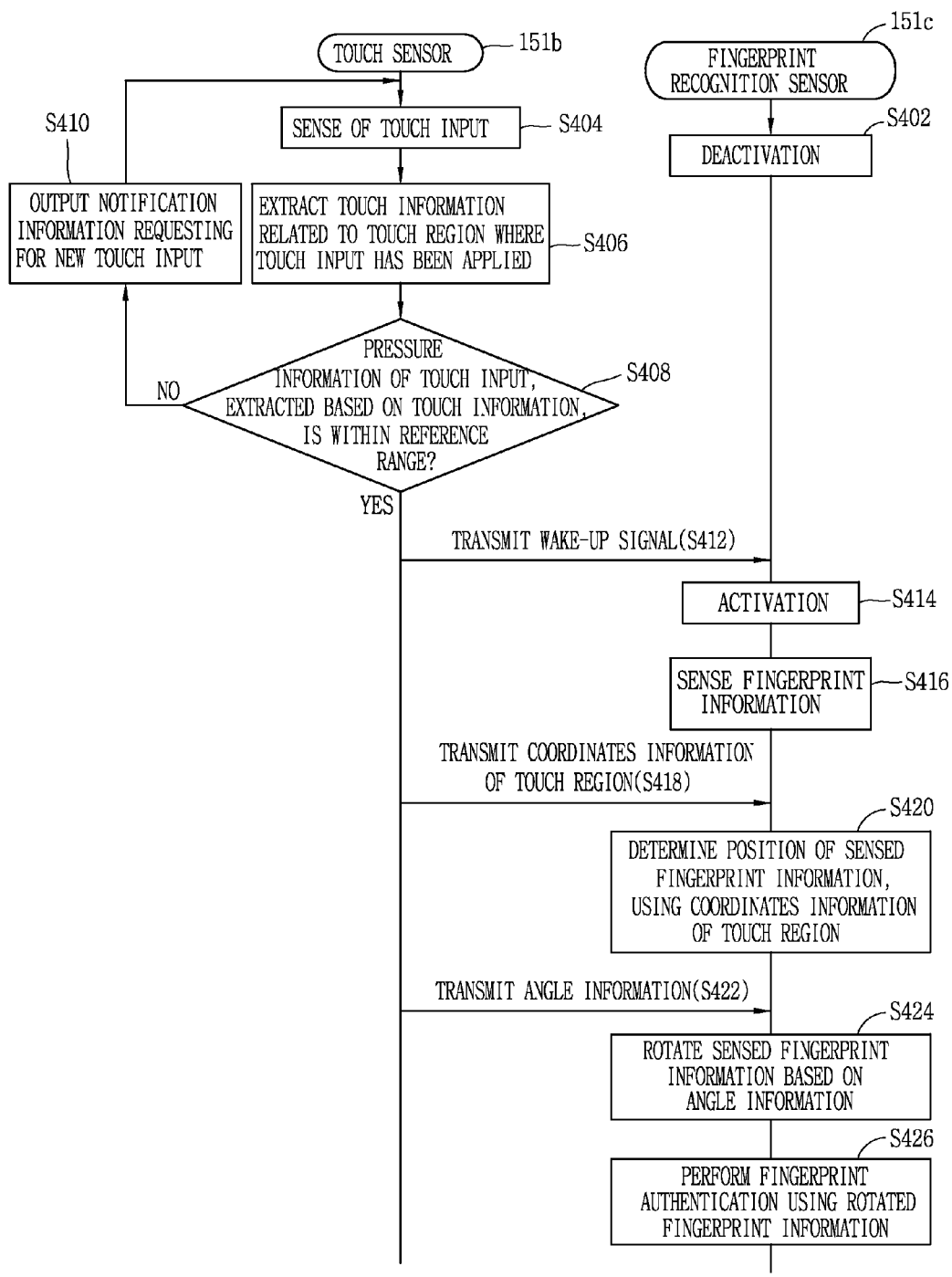
FIG. 4 is a flowchart illustrating a method of using touch information related to a touch region when fingerprint authentication is performed according to an embodiment of the present invention.
Figure 5:
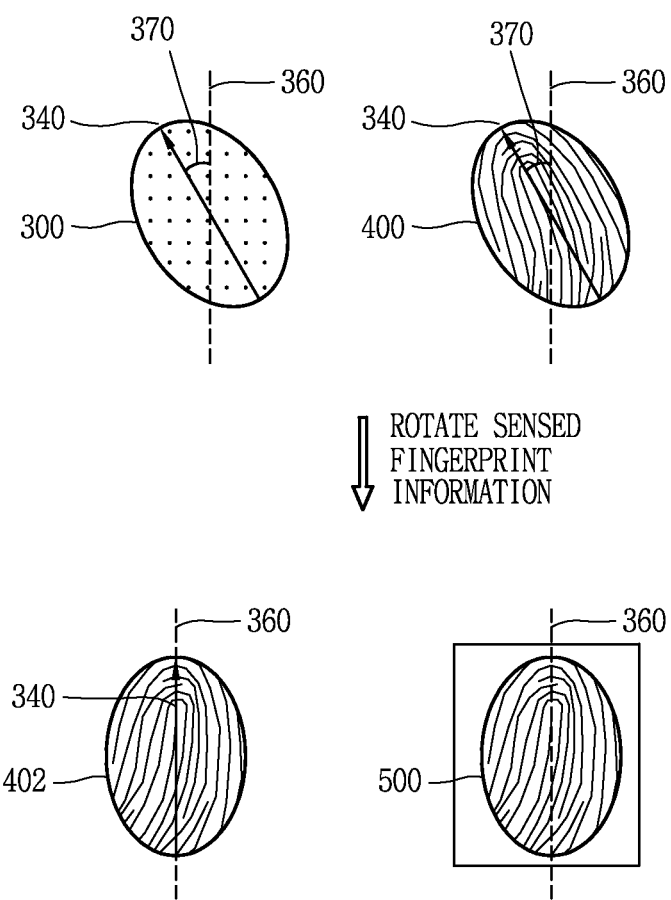
FIG. 5 is a conceptual view illustrating the control method of FIG. 4.

Hereinafter, a method of using touch information of a touch region to which a touch input has been applied when performing fingerprint authentication will be explained in more detail with reference to the attached drawings. In particular, FIG. 4 is a flowchart illustrating a method of using touch information related to a touch region when fingerprint authentication is performed according to an embodiment of the present invention, and FIG. 5 is a conceptual view illustrating the control method of FIG. 4.

The fingerprint recognition sensor 151*c* may be in a deactivated state (S402). The fingerprint recognition sensor 151*c* may be converted into an activated state when the touch input 30 is sensed, or may be converted into an activated state when pressure of the touch input 30 is within a reference range. The fingerprint recognition sensor 151*c* may be activated based on reception of a wake-up signal from the touch sensor 151*b*, the wake-up signal for converting a deactivated state into an activated state.

If a touch input is applied to the display unit 151 in a deactivated state of the fingerprint recognition sensor 151*c*, the touch sensor 151*b* can sense the touch input (S404). The touch sensor 151*b* can extract touch information related to the touch region 300 to which the touch input 30 has been applied, based on sensing of the touch input 30 (S406). More specifically, the controller 180 can extract, from the touch sensor 151*b*, touch information related to the touch region 300 on the display unit 151 to which the touch input 30 has been applied.

The touch information related to the touch region 300 may include coordinates information 310, 320, 330 of the touch region 300 on the display unit 151 to which the touch input 30 has been applied, angle information 370 indicating a tilted degree of the longest axis 340 of the touch region 300 based on the preset axis 360, etc. The touch sensor 151*b* can extract pressure information of the touch input 30, using touch information related to the touch region 300. More specifically, the controller 180 can extract a touch pressure with respect to the touch input 30 applied to the display unit 151, using touch information related to the touch region 300.

Then, the controller 180 can determine whether the pressure information of the touch input 30 extracted based on the touch information is within a reference range (S408). If the pressure information is out of the reference range as a result of the determination (No in S408), the controller 180 can output notification information requesting a new touch input (S410). The reason is as follows. When the pressure information of the touch input 30 is out of a reference range, a probability that fingerprint authentication fails becomes high. The notification information may be output in the form of vibration or sound. Alternatively, light may be output from the optical output unit 154 provided on a front surface of the body, as the notification information. When the display unit 151 is in an activated state, the notification information may be output to the display unit 151 in the form of a text, an image, etc.

If the pressure information is within the reference range as a result of the determination (Yes in S408), the touch sensor 151*b* can transmit, to the fingerprint recognition sensor 151*c*, a wake-up signal for converting a deactivated state into an activated state (S412). The wake-up signal may be transmitted to the fingerprint recognition sensor 151*c* from the touch sensor 151*b* when the touch input 30 is applied to the display unit 151 in S404. When the touch sensor 151*b* and the fingerprint recognition sensor 151*c* are controlled by the controller 180, transmission of a signal or information to the fingerprint recognition sensor 151*c* from the touch sensor 151*b* in FIG. 4 may mean use of the signal or information extracted or generated from the touch sensor 151*b* by the fingerprint recognition sensor 151*c*.

More specifically, when the pressure information of the touch input 30 is within a reference range, the controller 180 can convert the fingerprint recognition sensor 151*c* which is in a deactivated state into an activated state (S414). Then, the fingerprint recognition sensor 151*c* can sense fingerprint information 400 on a finger which has applied the touch input 30 to the touch region 300 (S416). More specifically, when the touch input 30 is applied to the display unit 151, the controller 180 can extract touch information related to the touch region 300 to which the touch input 30 has been applied. Further, the controller 180 can convert the fingerprint recognition sensor 151*c* which is in a deactivated state, into an activated state, based on the touch input 30. Further, the controller 180 can control the activated fingerprint recognition sensor 151*c* to sense fingerprint information of a finger which has applied the touch input 30 to the touch region 300.

Then, the fingerprint recognition sensor 151*c* can perform fingerprint authentication using the sensed fingerprint information. More specifically, the controller 180 can control the fingerprint recognition sensor 151*c* to sense the fingerprint information 400 on a finger which has applied the touch input 30 to the touch region 300. The fingerprint recognition sensor 151*c* determines a position where the fingerprint information 400 has been sensed. In this instance, the fingerprint recognition sensor 151*c* can receive, from the touch sensor 151*b*, coordinates information 310, 320, 330 of the touch region, included in touch information related to the touch region (S418). The fingerprint recognition sensor 151*c* can determine the sensed position of the fingerprint information 400, using the coordinates information 310, 320, 330 of the touch region (S420).

That is, the controller 180 can use the coordinates information 310, 320, 330 of the touch region 300, included in the touch information related to the touch region 300, for determination of the position of the fingerprint information 400 sensed by the fingerprint recognition sensor 151*c*. The coordinates information 310, 320, 330 of the touch region 300 may be information extracted from the touch sensor 151*b*.

Then, the controller 180 can perform fingerprint authentication based on whether the sensed fingerprint information 400 is consistent with pre-stored fingerprint information 500. More specifically, the controller 180 can perform fingerprint authentication based on whether features points of the sensed fingerprint information 400 are consistent with feature points of the pre-stored fingerprint information 500.

In this instance, the fingerprint recognition sensor 151c can receive angle information 370 from the touch sensor 151b (S422), and can rotate the sensed fingerprint information 400 based on the received angle information. More specifically, the controller 180 can determine a tilted degree of the sensed fingerprint information 400 based on the pre-stored fingerprint information 500, using the angle information extracted from the touch sensor 151b (the touch information related to the touch region).

The tilted degree of the sensed fingerprint information 400 based on the pre-stored fingerprint information 500 may mean a tilted degree of a finger which has applied the touch input based on the axis 360 parallel to a lengthwise direction of the display unit 151. That is, the pre-stored fingerprint information may be fingerprint information stored in a state where a finger is parallel to a lengthwise direction of the display unit 151.

Then, the fingerprint recognition sensor 151c can rotate the sensed fingerprint information 400 based on the angle information (S424). More specifically, when the angle information has a specific size (angle size) in one direction, the controller 180 can rotate the sensed fingerprint information 400 in another direction opposite to the one direction, using the fingerprint recognition sensor 151c.

Then, the fingerprint recognition sensor 151c can perform fingerprint authentication using the rotated fingerprint information (S426). More specifically, the controller 180 can determine whether the rotated fingerprint information 402 is consistent with the pre-stored fingerprint information 500. The steps (S422~S426) will be explained in more detail with reference to FIG. 5.

As shown in the first drawing of FIG. 5, the controller 180 can extract touch information of the touch region 300 to which a touch input has been applied, from the touch sensor 151b. The touch information of the touch region 300 may be angle information 370 indicating a tilted degree of a longest axis 340 of the touch region 300 based on a preset axis 360.

The controller 180 can determine a state of the fingerprint information 400 using the touch information of the touch region 300. More specifically, the controller 180 can determine a tilted degree of the sensed fingerprint information 400 based on the pre-stored fingerprint information 500, based on angle information extracted from the touch sensor 151b. The tilted degree of the sensed fingerprint information 400 based on the pre-stored fingerprint information 500 may mean a tilted degree of the sensed fingerprint information 400 based on the preset axis 360. That is, the preset axis 360 may be an axis parallel to a long side of the display unit 151. And the pre-stored fingerprint information 500 may be fingerprint information input (sensed or stored) in a state where a finger is parallel to a long side of the display unit.

Then, when the angle information 370 has a specific size in one direction, the controller 180 can rotate the sensed fingerprint information 402 in another direction opposite to the one direction, by the preset size, as shown in the second drawing of FIG. 5. Then, the controller 180 can determine whether the rotated fingerprint information 402 is consistent with the pre-stored fingerprint information 500. That is, the controller 180 can perform fingerprint authentication based on whether feature points of the rotated fingerprint information 402 are consistent with feature points of the pre-stored fingerprint information 500.

The aforementioned execution by the touch sensor 151b or the fingerprint recognition sensor 151c can be understood as execution by the controller 180. Further, the aforementioned execution by the controller 180 can be understood as execution by the touch sensor 151b or the fingerprint recognition sensor 151c.

When fingerprint authentication is performed by the controller 180, transmission of a signal or information from the touch sensor 151b to the fingerprint recognition sensor 151c in FIG. 4 may be understood use of a signal or information extracted from the touch sensor 151b (e.g., touch information related to a touch region) by the controller 180 when performing fingerprint authentication.

As aforementioned, in an embodiment of the present invention, touch information related to a touch region, extracted from the touch sensor, may be used for fingerprint authentication. More specifically, in an embodiment of the present invention, a position of fingerprint information sensed by the fingerprint recognition sensor may be determined based on coordinates information included in the touch information extracted from the touch sensor. Further, in an embodiment of the present invention, the controller 180 can perform fingerprint authentication by determining a tilted degree of fingerprint information sensed by the fingerprint recognition sensor, based on angle information included in touch information extracted from the touch sensor, and then by rotating the sensed fingerprint information. In this configuration, a calculation amount required to determine a position and a tilted degree of fingerprint information based on only fingerprint information, is reduced, thereby significantly increasing a speed of fingerprint authentication.

Hereinafter, a method of using touch information related to a touch region when performing fingerprint authentication, and of performing a specific function based on a result of the fingerprint authentication will be explained in more detail with reference to the attached drawings. In particular, FIGS. 6, 7A, 7B, 8, 9A and 9B are conceptual view illustrating functions executed based on a fingerprint authentication result with respect to a finger which has applied a preset type of touch input to a mobile terminal according to an embodiment of the present invention.

In an embodiment of the present invention, various functions may be executed when a preset type of touch input is applied to the display unit 151. For instance, the controller 180 can convert the display unit 151 which is in a deactivated state, into an activated state when a preset type of touch input is applied to the display unit 151.

Figure 6:
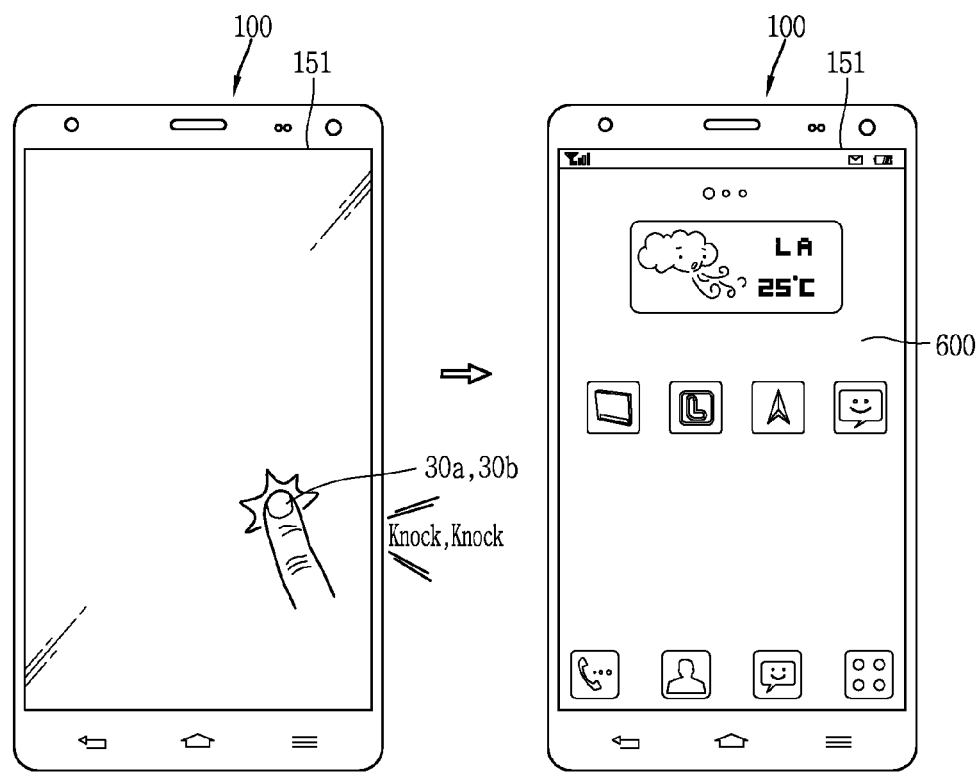

For instance, as shown in the first drawing of FIG. 6, the preset type of touch input may be touch inputs 30a, 30b applied at least twice within a reference time. When at least two touch inputs 30a, 30b are applied to the display unit 151 which is in a deactivated state within a reference time, the controller 180 can convert the deactivated state of the display unit 151 into an activated state, and may output a home screen page 600 to the display unit 151.

Further, when a preset type of touch input is applied to the display unit 151 which is in a deactivated state, and when fingerprint information of a finger which has applied the preset type of touch input corresponds to pre-stored fingerprint information, the controller 180 can convert the deactivated state of the display unit 151 into an activated state. The preset type of touch input may be touch inputs applied at least two times within a reference time.

If touch inputs of at least two times are applied to the display unit 151 which is in a deactivated state, and if a pattern formed by a point where the touch inputs of at least two times are applied corresponds to a preset pattern, the controller 180 can convert the display unit 151 into an activated state. Likewise, if fingerprint information of a finger which has applied one of the touch inputs of at least two times corresponds to pre-stored fingerprint information, the controller 180 can convert the display unit 151 into an activated state.

In this instance, the controller 180 can perform fingerprint authentication using fingerprint information of a finger which has applied one of the touch inputs of at least two times. For instance, the controller 180 can perform fingerprint authentication using fingerprint information of a finger which has applied the last touch input among the touch inputs of at least two times.

When the first touch input 30a is applied to the display unit 151, the controller 180 can extract, from the touch sensor 151b, touch information related to the touch region 300 to which the first touch input 30a has been applied. When the second touch input 30b different from the first touch input 30a is applied, within a reference time, to the touch region 300 to which the first touch input 30a has been applied, the controller 180 can sense fingerprint information of a finger which has applied the second touch input 30b, using the fingerprint recognition sensor 151c.

The fingerprint recognition sensor 151c can be converted into an activated state from a deactivated state when the first touch input 30a is applied. Further, when pressure information of the first touch input 30a, extracted based on the touch information related to the touch region 300 to which the first touch input 30a has been applied, is within a reference range, the fingerprint recognition sensor 151c can be converted into an activated state from a deactivated state.

Then, the controller 180 can use touch information related to the touch region 300 to which the first touch input has been applied, when performing fingerprint authentication with respect to fingerprint information of the finger which has applied the second touch input. The method of using touch information related to the touch region 300 to which the first touch input has been applied, at the time of performing fingerprint authentication may be explained by the descriptions with reference to FIGS. 2 to 5.

If the second touch input 30b is applied, within a reference time, to a touch region 300b different from a touch region 300a where the first touch input 30a has been applied, the controller 180 can extract touch information related to the touch region 300b where the second touch input 30b has been applied. Then, for fingerprint authentication, the controller 180 can use touch information related to the touch region 300b where the second touch input has been applied, rather than touch information related to the touch region 300a where the first touch input has been applied. The fingerprint information used for fingerprint authentication may be fingerprint information of the finger which has applied the second touch input 30b.

For instance, as shown in the first drawing of FIG. 7A, the first touch input 30a may be applied in a deactivated state of the display unit 151. The controller 180 can convert the fingerprint recognition sensor 151c which is in a deactivated state, into an activated state when the first touch input 30a is applied. The controller 180 can extract, from the touch sensor 151b, touch information related to the touch region 300a where the first touch input 30a has been applied.

As shown in the second drawing of FIG. 7A, the second touch input 30b different from the first touch input 30a may be applied to the region 300 to which the first touch input 30a has been applied, within a reference time based on a time point when the first touch input 30a has been applied. The controller 180 can sense the fingerprint information 400 on a finger which has applied the second touch input 30b, using the fingerprint recognition sensor 151c.

Then, as shown in the third drawing of FIG. 7A, the controller 180 can use touch information related to the touch region 300 where the first touch input 30a has been applied, when performing fingerprint authentication with respect to the fingerprint information 400 on the finger which has applied the second touch input 30b.

When the fingerprint authentication is successful, as shown in the third drawing of FIG. 7A, the controller 180 can convert the display unit 151 which is in a deactivated state into an activated state, and may output the home screen page 600 to the display unit 151.

Figure 7B:
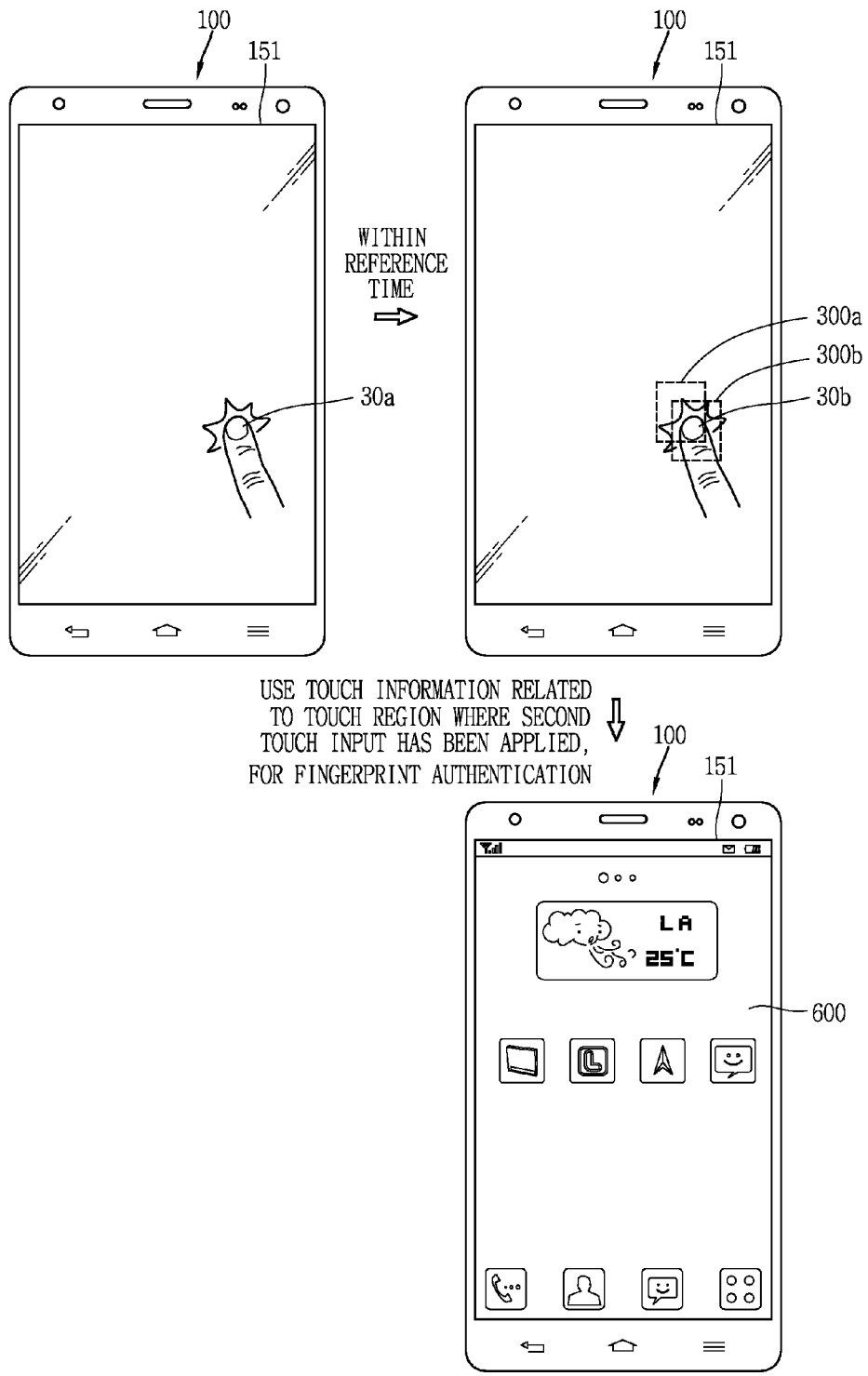

As another example, as shown in the first drawing of FIG. 7B, the first touch input 30a may be applied to the display unit 151 which is in a deactivated state. The controller 180 can extract, from the touch sensor 151b, touch information related to the touch region 300a to which the first touch input 30a has been applied. Then, as shown in the second drawing of FIG. 7B, the second touch input 30b different from the first touch input 30a may be applied to a touch region 300b different from the touch region 300a where the first touch input 30a has been applied, within a reference time based on a time point when the first touch input 30a has been applied.

The controller 180 can extract touch information related to the touch region 300b where the second touch input 30b has been applied, from the touch sensor 151b. Further, the controller 180 can extract touch information related to the touch region 300b where the second touch input 30b has been applied, from the touch sensor 151b, when the touch input is applied to the touch region 300b different from the touch region 300a where the first touch input 30a has been applied.

Then, as shown in the third drawing of FIG. 7B, the controller 180 can use the touch information related to the touch region 300b where the second touch input 30b has been applied, at the time of performing fingerprint authentication with respect to fingerprint information of the finger which has applied the second touch input 30b. A method of using touch information related to the touch region 300b where the second touch input 30b has been applied, during fingerprint authentication may be explained by the descriptions with reference to FIGS. 2 to 5.

Even if the second touch input 30b is applied to the touch region 300b different from the touch region 300a where the first touch input 30a has been applied, the controller 180 can use at least part of the touch information related to the touch region 300a where the first touch input 30a has been applied, for fingerprint authentication. For instance, when the second touch input 30b is applied to the touch region 300b different from the touch region 300a where the first touch input 30a has been applied, the controller 180 can use angle information included in the touch information related to the touch region 300a where the first touch input 30a has been applied.

The controller 180 can convert the display unit 151 to an activated state, in cases where touch inputs of at least two times are applied to the display unit 151 which is in a deactivated state, a pattern formed by a point where the touch inputs of at least two times are applied corresponds to a preset pattern, and fingerprint information of a finger which has applied one of the two touch inputs corresponds to pre-stored fingerprint information.

For instance, the controller 180 can extract, from the touch sensor 151b, touch information of a touch region where one of the two touch inputs (e.g., the last touch input) has been applied, and may sense fingerprint information of a finger which has applied the one touch input (e.g., the last touch input). Then, the controller 180 can use the touch information related to the touch region where the one touch input (e.g., the last touch input) has been applied, at the time of performing fingerprint authentication with respect to fingerprint information of a finger which has applied the one touch input (e.g., the last touch input).

The last touch input may be determined based on a touch frequency (the number of touch times) set to a preset type of touch input for activating the display unit 151 which is in a deactivated state. For instance, when the preset type of touch input corresponds to a touch input that a third touch input is applied within a reference time, the last touch input may be a third touch input. Even if the preset type of touch input has been applied to the display unit 151 which is in a deactivated state, if fingerprint authentication with respect to fingerprint information of a finger which has applied the preset type of touch input fails, the controller 180 can maintain the deactivated state of the display unit 151.

If a preset type of touch input is applied to the display unit 151 which is in a deactivated state, the controller 180 can change the display unit 151 into an activated state. More specifically, if a preset type of touch input is applied to the display unit 151, even if fingerprint authentication with respect to fingerprint information of a finger which has applied the preset type of touch input fails, the controller 180 can change the deactivated state of the display unit 151 into an activated state.

As aforementioned, the preset type of touch input may be application of touch inputs of at least two times within a reference time. Different screen information may be output to the activated display unit 151, based on whether fingerprint authentication has been successful or not with respect to fingerprint information of a finger which has applied the preset type of touch input. More specifically, when the fingerprint authentication with respect to fingerprint information of a finger which has applied the preset type of touch input has succeeded, the controller 180 can output first screen information to the activated display unit 151. Further, when the fingerprint authentication has failed, the controller 180 can output second screen information different from the first screen information, to the activated display unit 151.

For instance, when a preset type of touch input is applied to the display unit 151 which is in a deactivated state, the controller 180 can change the display unit 151 into an activated state. If the mobile terminal is in a locked state, the controller 180 can release the locked state based on success of the fingerprint authentication. Then, as shown in FIGS. 7A and 7B, the controller 180 can output the home screen page 600 to the activated display unit 151.

If the fingerprint authentication fails when the mobile terminal is in a locked state, the controller 180 can output a screen 700 corresponding to the locked state, to the activated display unit 151 as shown in the third drawing of FIG. 8. A graphic object 720 for guiding the touch region 300 where a preset type of touch input has been applied may be displayed on the screen 700 corresponding to the locked state. The graphic object 720 may be displayed to correspond to at least one of touch regions where touch inputs of at least two times have been applied.

In addition, when touch inputs of at least two times are applied to the display unit 151 which is in a deactivated state within a reference time, the controller 180 can convert the display unit 151 into an activated state. Then, if fingerprint authentication with respect to fingerprint information of a finger which has applied the touch inputs has failed, the controller 180 can output the screen 700 corresponding to the locked state to the activated display unit 151.

The screen 700 corresponding to the locked state may include at least one graphic object 720 for guiding the touch regions where the touch inputs of at least two times have been applied. The controller 180 can output at least two graphic objects in correspondence to all of the touch regions where the touch inputs of at least two times have been applied. Alternatively, the controller 180 can output a single graphic object in correspondence to a largest touch region among the touch regions where the touch inputs of at least two times have been applied.

The screen 700 corresponding to the locked state may include notification information 710 for guiding a new touch input. If a new touch input is applied to the graphic object 720 included in the screen 700 corresponding to the locked state, the controller 180 can sense fingerprint information of a finger which has applied the new touch input. And the controller 180 can use the touch information related to the touch region where the preset type of touch input has been applied, at the time of performing fingerprint authentication with respect to the sensed fingerprint information.

When the new touch input is applied, the controller 180 extracts, from the touch sensor 151, the touch information related to the touch region where the new touch input has been applied. And the controller 180 can perform fingerprint authentication with respect to fingerprint information of a finger which has applied the new touch input, using the extracted touch information. The controller 180 can execute a preset application based on whether the fingerprint authentication has been successful or not.

Figure 9A:
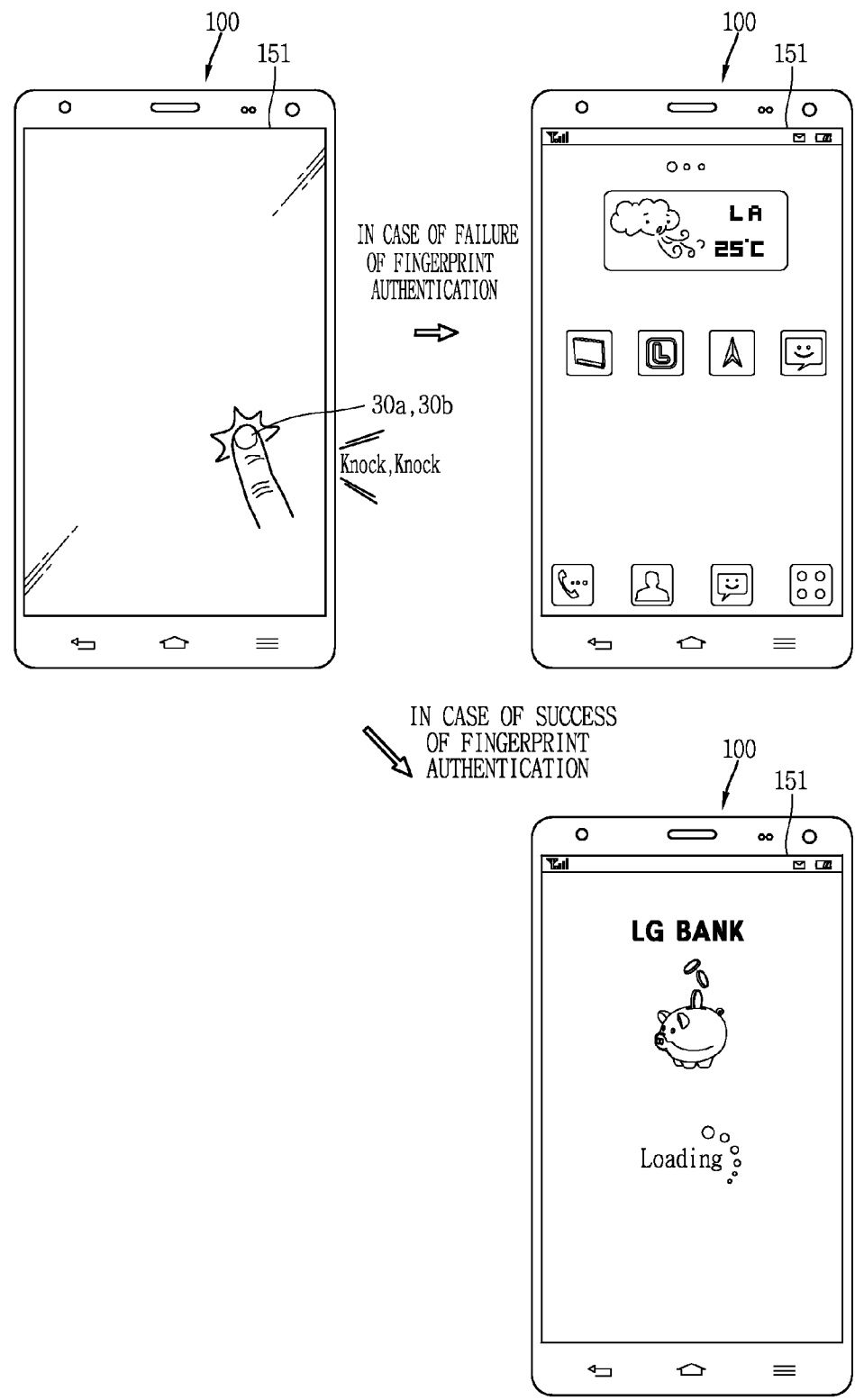

For instance, as shown in the first drawing of FIG. 9A, a preset type of touch input (e. g., touch inputs 30a, 30b applied at least two times within a reference time) may be applied to the display unit 151 which is in a deactivated state. The controller 180 can convert the display unit 151 into an activated state when the preset type of touch input is applied.

In this instance, the controller 180 can perform fingerprint authentication with respect to fingerprint information of a finger which has applied the preset type of touch input. The controller 180 can use the touch information related to the touch region where the preset type of touch input has been applied, at the time of performing fingerprint authentication with respect to the fingerprint information.

If the fingerprint authentication has failed, the controller 180 can output a home screen page 600 to the activated display unit 151, as shown in the second drawing of FIG. 9A. Further, if the fingerprint authentication has succeeded, the controller 180 can execute a preset application, and may output an execution screen of the preset application to the activated display unit 151.

The preset application is an application preset to be executed when fingerprint authentication has been successful, which may be an application related to finance/bank, an application requiring a login, an application requiring a user authentication, etc. For instance, as shown in the third drawing of FIG. 9A, when a preset type of touch input is applied to the display unit 151 which is in a deactivated state, and when fingerprint authentication with respect to fingerprint information of a finger which has applied the touch input is successful, the controller 180 can convert the display unit 151 into an activated state. And the controller 180 can output an execution screen of the preset application (e.g., an execution screen of a bank-related application) to the display unit 151.

If a touch input is applied to the activated display unit 151, and if fingerprint information of a finger which has applied the touch input corresponds to pre-stored fingerprint information, the controller 180 can execute a preset application. More specifically, the controller 180 can sense that the touch input 30 has been applied to an empty space among screen information (e.g., home screen page) displayed on the display unit 151. The empty space means a region where a graphic object for performing a specific function according to a touch input (e.g., an icon, a status display line, etc.) has not been output.

Once the touch input 30 is applied, the controller 180 can extract, from the touch sensor 151b, touch information related to the touch region 300 where the touch input 30 has been applied. Further, the controller 180 can sense fingerprint information of a finger which has applied the touch input, using the fingerprint recognition sensor 151c.

Then, the controller 180 can use the touch information related to the touch region, at the time of performing fingerprint authentication with respect to the fingerprint information. If the fingerprint authentication with respect to the fingerprint information has been successful, the controller 180 can execute a preset application, and may output an execution screen of the preset application to the display unit 151.

Figure 9B:
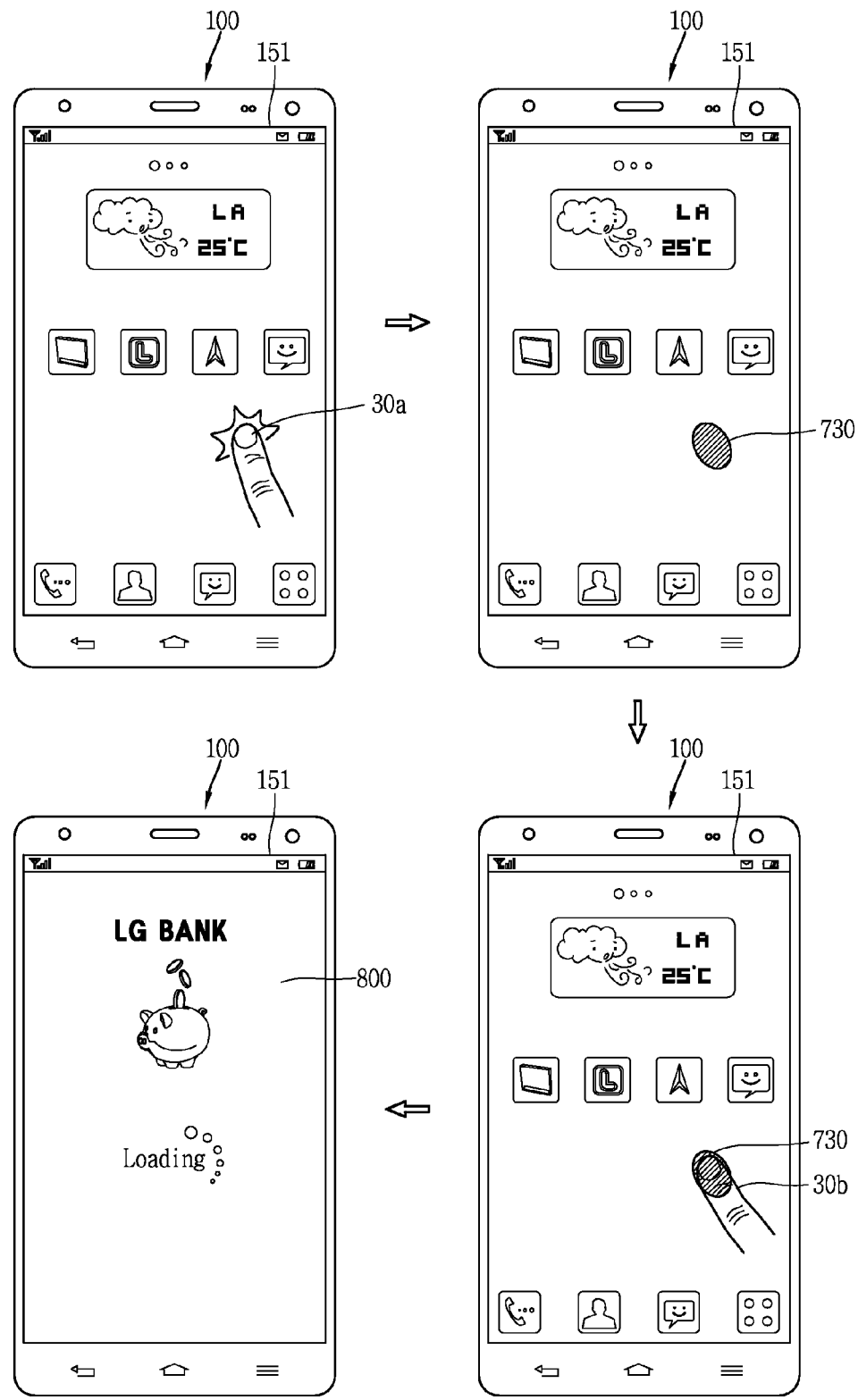

As another example, as shown in the first drawing of FIG. 9B, the controller 180 can sense the touch input 30a applied to an empty space among screen information output to the display unit 151. The controller 180 can convert the fingerprint recognition sensor 151c which is in a deactivated state, into an activated state when the touch input 30a is applied. Further, when pressure information of the touch input 30a is within a reference range, the controller 180 can convert the fingerprint recognition sensor 151c which is in a deactivated state, to an activated state.

If the touch input 30a is applied to the empty space, the controller 180 can output a graphic object 730 for guiding the touch region where the touch input 30a has been applied, to the display unit 151. The graphic object 730 may be formed to correspond to the touch region where the touch input 30a has been applied. The controller 180 can extract, from the touch sensor 151, touch information related to the touch region 300 where the touch input 30a has been applied.

Then, if a new touch input 30b is applied to the graphic object 730 as shown in the third drawing of FIG. 9B, the controller 180 can sense fingerprint information of a finger which has applied the new touch input 30b. More specifically, if the new touch input 30b is applied in correspondence to the touch region 300 where the touch input 30a has been applied, the controller 180 can perform fingerprint authentication with respect to the new touch input 30b, using the touch information related to the touch region 300 where the touch input 30a has been applied.

The new touch input 30b may be a touch input applied within a reference time based on a time point when the touch input 30a has been applied to the empty space. More specifically, the controller 180 can activate the fingerprint recognition sensor 151c when the touch input 30a is applied, and may output the graphic object 730 to the display unit 151 in correspondence to the touch region 300 where the touch input 30a has been applied. Then, if the new touch input 30b is not applied within a reference time based on a time point when the touch input 30a has been applied, the controller 180 can convert the activated fingerprint recognition sensor 151c into a deactivated state, and may control the graphic object 730 to disappear.

If the fingerprint authentication has been successful, as shown in the fourth drawing of FIG. 9B, the controller 180 can execute a preset application, and output an execution screen of the preset application to the display unit 151.

Thus, embodiments of the present invention include the following advantages. Firstly, a speed of fingerprint authentication can be significantly increased by using touch information related to a touch region where a touch input has been applied, and a new user interface related to the fingerprint authentication can be provided.

As aforementioned, since fingerprint authentication is performed by using touch information related to a touch region where a touch input has been applied, a data calculation amount required to perform the fingerprint authentication can be significantly reduced. More specifically, in an embodiment of the present invention, a position of fingerprint information can be determined based on coordinates information included in touch information. Further, a tilted degree of sensed fingerprint information based on pre-stored fingerprint information can be determined by using angle information included in touch information. Further, fingerprint authentication can be performed after tilted fingerprint information is rotated based on the angle information. Thus, in an embodiment of the present invention, a calculation amount, required to determine a position and a tilted degree of fingerprint information of fingerprint information based on only sensed fingerprint information, can be significantly reduced by using touch information. This can allow a speed of fingerprint authentication to be significantly enhanced.

Further, in an embodiment of the present invention, pressure information of a touch input applied to the display unit may be extracted by using touch information related to a touch region where the touch input has been applied, and a state of fingerprint information may be determined based on the pressure information. Thus, in an embodiment of the present invention, when pressure information of a touch input is out of a reference range, notification information requesting for a new touch input may be output to a touch region where the touch input has been applied, before fingerprint information is sensed. This can reduce the amount of a battery used to sense fingerprint information. Further, in an embodiment of the present invention, the mobile terminal can induce a user to apply a touch input optimum for fingerprint authentication, using pressure information of the touch input.

Further, in an embodiment of the present invention, the fingerprint recognition sensor may maintain a deactivated state, and the fingerprint recognition sensor which is in the deactivated state may be converted into an activated state when a touch input is applied. This can reduce a consumption amount of a battery by the fingerprint recognition sensor.

Further, in an embodiment of the present invention, when a preset type of touch input is applied to the display unit which is in a deactivated state, and when fingerprint information of a finger which has applied the preset type of touch input corresponds to pre-stored fingerprint information, the display unit may be converted into an activated state. This can allow the mobile terminal to provide a new user interface with enhanced security.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a wireless communication unit configured to provide wireless communication;
a display unit including a touch sensor and a fingerprint recognition sensor overlapped with the touch sensor; and
a controller configured to:
deactivate the display unit,
receive at least two touch inputs within a reference time in a state where the display unit is deactivated, wherein the at least two touch inputs include a first touch input and a second touch input different from the first touch input, and the first touch input and the second touch input are applied to one region of the display unit, and
activate the deactivated display unit in response to the at least two touch inputs,
wherein the controller is further configured to:
extract, from the touch sensor, touch information of the first touch input, wherein the touch information is different from fingerprint information,
sense, from the fingerprint recognition sensor, fingerprint information of the finger which has applied the second touch input, and
perform fingerprint authentication with respect to the sensed fingerprint information of the finger which has applied the second touch input using the extracted touch information of the first touch input, and
wherein different screen information is output to the activated display unit based on whether the fingerprint authentication with respect to the sensed fingerprint information of the finger which has applied the second touch input has been successful.

2. The mobile terminal of claim 1, wherein the touch information includes at least one of coordinate information of the one region where the first touch input has been applied to the display unit, and angle information indicating a tilted degree of a longest axis of the one region based on a preset axis.

3. The mobile terminal of claim 2, wherein the controller is further configured to determine a position on the display unit where the fingerprint information has been sensed, using the coordinates information of the one region, when performing the fingerprint authentication.

4. The mobile terminal of claim 2, wherein the controller is further configured to:
perform the fingerprint authentication based on whether or not the sensed fingerprint information is consistent with pre-stored fingerprint information, and
determine a tilted degree of the sensed fingerprint information based on the pre-stored fingerprint information, using the angle information extracted from the touch sensor.

5. The mobile terminal of claim 4, wherein when the angle information has a specific size in one direction, the controller is further configured to:
rotate the sensed fingerprint information in another direction opposite to the one direction, by the specific size, and
determine whether the rotated fingerprint information is consistent with the pre-stored fingerprint information.

6. The mobile terminal of claim 1, wherein the controller is further configured to:
extract pressure information of the first touch input, using the touch information related to the one region where the first touch input has been applied, and
when the pressure information of the first touch input is out of a reference range, output notification information requesting for a new touch input to the one region, before sensing the fingerprint information.

7. The mobile terminal of claim 1, wherein the controller is further configured to:
deactivate the display unit, and
activate the display unit when the fingerprint information of the finger corresponds to pre-stored fingerprint information.

8. The mobile terminal of claim 1, wherein when the second touch input is applied to a one region different from the touch region where the first touch input has been applied, the controller is further configured to extract touch information related to the touch region where the second touch input has been applied, and
wherein for fingerprint authentication, the controller is further configured to use the touch information related to the touch region where the second touch input has been applied, rather than the touch information related to the one region where the first touch input has been applied.

9. The mobile terminal of claim 1, wherein the controller is further configured to activate the fingerprint recognition sensor when the first touch input is applied.

10. The mobile terminal of claim 1, wherein the controller is further configured to:
enter the mobile terminal is in a locked state and display a lock screen,
release the locked state based on success of the fingerprint authentication, and output a home screen page to the activated display unit, and
when the fingerprint authentication fails when the mobile terminal is in the locked state, output a screen corresponding to the locked state on the activated display unit.

11. The mobile terminal of claim 10, wherein the controller is further configured to:
display a graphic object for guiding a touch region where of the finger touch input has been applied on the lock screen, and
if a new finger touch input is applied to the graphic object, sense new fingerprint information of a finger which has applied the new touch input, and use touch information related to the touch region where the finger touch input has been applied, when performing fingerprint authentication with respect to the sensed new fingerprint information.

12. A method of controlling a mobile terminal, the method comprising:
deactivating, via a controller of the mobile terminal, a display unit of the mobile terminal, wherein the display unit includes a touch sensor and a fingerprint recognition sensor overlapped with the touch sensor;

receiving, on the display unit, at least two touch inputs within a reference time in a state where the display unit is deactivated, wherein the at least two touch inputs include a first touch input and a second touch input different from the first touch input, and the first touch input and the second touch input are applied to one region of the display unit; and activating, via the controller, the deactivated display unit in response to the at least two touch inputs, wherein the method further comprises:

extracting, from the touch sensor, touch information of the first touch input, wherein the touch information is different from fingerprint information;

sensing, from the fingerprint recognition sensor, fingerprint information of the finger which has applied the second touch input; and performing fingerprint authentication with respect to the sensed fingerprint information of the finger which has applied the second touch input using the extracted touch information of the first touch input, and wherein different screen information is output to the activated display unit based on whether the fingerprint authentication with respect to the sensed fingerprint information of the finger which has applied the second touch input has been successful.

13. The method of claim 12, wherein the touch information includes at least one of coordinate information of the one region where the first touch input has been applied to the display unit, and angle information indicating a tilted degree of a longest axis of the one region based on a preset axis.

14. The method of claim 13, further comprising:
determining a position on the display unit where the fingerprint information has been sensed, using the coordinates information of the one region, when performing the fingerprint authentication.

15. The method of claim 13, further comprising:
performing the fingerprint authentication based on whether or not the sensed fingerprint information is consistent with pre-stored fingerprint information; and
determining a tilted degree of the sensed fingerprint information based on the pre-stored fingerprint information, using the angle information extracted from the touch sensor.

16. The method of claim 5, wherein when the angle information has a specific size in one direction, the method further comprises:
rotating the sensed fingerprint information in another direction opposite to the one direction, by the specific size; and
determining whether the rotated fingerprint information is consistent with the pre-stored fingerprint information.

* * * * *